(12) United States Patent
Ozturk et al.

(10) Patent No.: US 7,880,992 B2
(45) Date of Patent: Feb. 1, 2011

(54) PHASE DETECTOR THAT COMPENSATES FOR FREQUENCY VARIATION INDUCED BIAS IN PHASES OF SERVO BURST FIELDS

(75) Inventors: Mustafa Can Ozturk, Bloomington, MN (US); Richard Lyle Keizer, Minnetonka, MN (US); Puskal Prasad Pokharel, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 188 days.

(21) Appl. No.: 12/261,472

(22) Filed: Oct. 30, 2008

(65) Prior Publication Data

US 2010/0053800 A1 Mar. 4, 2010

Related U.S. Application Data

(60) Provisional application No. 61/093,480, filed on Sep. 2, 2008.

(51) Int. Cl.
*G11B 5/09* (2006.01)
*G11B 5/596* (2006.01)

(52) U.S. Cl. .................................. 360/51; 360/77.08
(58) Field of Classification Search ................ None
See application file for complete search history.

(56) References Cited

U.S. PATENT DOCUMENTS

| 4,549,232 | A | 10/1985 | Axmear et al. |
|---|---|---|---|
| 4,587,579 | A | 5/1986 | Cocke et al. |
| 4,912,576 | A | 3/1990 | Janz |
| 5,615,065 | A | 3/1997 | Cheung |
| 6,366,423 | B1 | 4/2002 | Ahn |
| 7,167,329 | B2 | 1/2007 | Baker |
| 7,209,314 | B2 | 4/2007 | Bandic et al. |
| 7,508,611 | B2 * | 3/2009 | Buch et al. ............ 360/51 |

* cited by examiner

*Primary Examiner*—Daniell L Negrón
*Assistant Examiner*—Regina N. Holder
(74) *Attorney, Agent, or Firm*—David K. Lucente (57) ABSTRACT

In a servo control loop, phase detection between a clock signal and servo burst fields on a movable storage media is carried out with compensation for the effects of frequency variation in the timing of servo burst fields.

20 Claims, 2 Drawing Sheets

PHASE DETECTOR THAT COMPENSATES FOR FREQUENCY VARIATION INDUCED BIAS IN PHASES OF SERVO BURST FIELDS

CROSS REFERENCE TO RELATED APPLICATION

The present application claims the benefit of and priority to U.S. Provisional Patent Application No. 61/093,480, filed Sep. 2, 2008, entitled "PHASE DETECTOR THAT COMPENSATES FOR FREQUENCY VARIATION INDUCED BIAS IN PHASES OF SERVO BURST FIELDS," the disclosure of which is hereby incorporated herein by reference in its entirety.

BACKGROUND

The present invention generally relates to controlling transducer movement and, more particularly, to controlling transducer movement responsive to a position error signal within a servo control loop.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following mode wherein the head is maintained over the center of the target track while data is written/read. During track following, prerecorded servo burst fields are sensed by the head and demodulated to generate a position error signal (PES), which provides an indication of the position error of the head away from a desired location along the track (e.g., the track center). The PES is then converted into an actuator control signal, which is fed back to a head actuator that positions the head.

As the areal density of magnetic disc drives increases, so does the need for more precise position control when track following, especially in the presence of vibrations which can cause non-repeatable runout (NRRO) of the position error.

SUMMARY

In a servo control loop, phase detection between a clock signal and servo burst fields on a movable storage media is carried out with compensation for the effects of frequency variation in the timing of servo burst fields.

In some embodiments, a phase detector detects phases between a clock signal and a plurality of servo burst fields on a moving storage media. A relative phase difference is determined between the detected phases for at least two of the servo burst fields, and a frequency variation induced bias in the detected phases is determined in response to timing of the at least two servo burst fields. The relative phase difference is combined with the determined frequency variation induced bias to generate a corrected relative phase difference.

In some other embodiments, a process for detecting phases between a clock signal and a plurality of servo burst fields includes determining a relative phase difference between the detected phases, and determining a frequency variation induced bias in the detected phases in response to timing of the servo burst fields. The relative phase difference is combined with the determined frequency variation induced bias to generate a corrected relative phase difference.

In some other embodiments, a phase detection module samples a read signal, which contains servo burst field components, N1 times between an end of a preamble and a beginning of a first servo burst field, samples the read signal N times between the beginning and an end of the first servo burst field, detects phases between a clock signal and the first servo burst field and a second servo burst field, and determines a relative phase difference between the detected phases for the first and second servo burst fields. A bias determination module sums the phases of the first and second servo burst fields to generate a frequency variation induced bias that indicates effect of frequency variation on the detected phases. A phase correction module scales the frequency variation induced bias by a ratio of N to N1, and adds the scaled frequency variation induced bias to the relative phase difference between the phases for the first and second servo burst fields to generate a corrected relative phase difference which is output to a servo control module.

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor responsive to servo control bursts on a movable medium.

Figure 1:
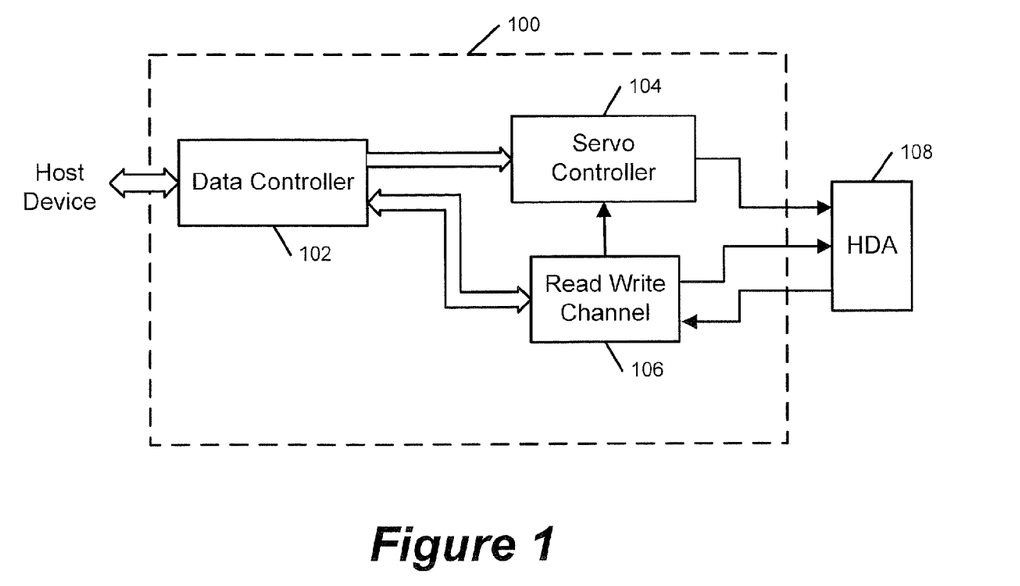
FIG. 1 is a block diagram of disk drive electronic circuits that include a servo controller that is configured in accordance with some embodiments.

FIG. 1 is a block diagram of disk drive electronic circuits 100 which include a data controller 102, a servo controller 104, and a read write channel 106. Although two separate controllers 102 and 104 and a read write channel 106 have been shown for purposes of illustration and discussion, it is to be understood that their functionality described herein may be integrated within a common integrated circuit package or distributed among more than one integrated circuit package. A head disk assembly (HDA) 108 can include a plurality of data storage disks, a plurality of heads (an exemplary type of data sensor) mounted to respective arms and which are moved radially across different data storage surfaces of the disks by a head actuator (e.g., voice coil motor), and a spindle motor which rotates the disks.

Write commands and associated data from a host device can be buffered by the data controller 102. The host device can include, but is not limited to, a desktop computer, a laptop computer, a personal digital assistant (PDA), a digital video recorder/player, a digital music recorder/player, and/or another electronic device that can be communicatively coupled to store and retrieve data in the HDA 108. The data controller 102 carries out buffered write commands by formatting the associated data into blocks with the appropriate header information, and transfers the formatted data via the read/write channel 106 to logical block addresses (LBAs) on a disk in the HDA 108 identified by the associated write command.

The read write channel 106 can convert data between the digital signals processed by the data controller 102 and the analog signals conducted through the heads in the HDA 108. The read write channel 106 provides a read signal including servo burst fields read from servo bursts on a selected disk surface to the servo controller 104. The servo burst fields can be used to detect the radial location of the head relative to tracks on the disk surface. The servo controller 104 uses the servo burst fields to maintain the heading alignment with a defined track while data is written/read along the track on the disk surface (i.e., track following mode).

The servo burst fields can be defined by patterns that are phase offset relative to one another in a radial direction on the disk. The servo controller 104 can thereby detect phase differences between a clock signal and a plurality of servo burst fields in the read signal and determine therefrom the radial location of the head relative to the track on the disk. Exemplary phase offset servo burst patterns are described in U.S. Pat. No. 4,549,232, the entire disclosures of which are incorporated herein by reference as if set forth in their entirety. Accordingly, reference is made to the exemplary phase servo burst patterns of U.S. Pat. No. 4,549,232, the description of which is incorporated by reference herein, and further particular description of those patterns is therefore omitted for brevity.

A head 210 generates a read signal that includes components that are generated by the preamble and the servo burst fields, and other fields of the servo sector. The servo controller 104 detects phase between a clock signal and timing features of each of the servo burst fields. The servo controller 104 can phase align the clock signal with timing features of the preamble 204. The phase that is detected between the clock signal and the servo burst fields increases and decreases as the head 210 is displaced radially in opposite respective directions from the track centerline extending between the first and second patterns. In view of their antisymmetric geometry, the phase of the servo burst field can change oppositely to the phase of the servo burst field as the head is displaced 210. Accordingly, the servo controller 104 determines relative phase differences between the detected phases by subtracting the detected phases to increase the sensitivity of its measurement of cross-track head position. In accordance with some embodiments, the servo controller 104 determines a frequency variation induced bias in the detected phases in response to timing of the at least two servo burst fields, and combines the relative phase difference with the determined frequency variation induced bias to generate a corrected relative phase difference. The servo controller 104 generates a servo position error signal (PES) in response to the corrected relative phase difference and a reference position signal, and positions the head 210 relative to a track centerline in response to the PES.

Although some embodiments herein will be discussed in the context of the discrete time domain (i.e., digital circuitry), using a sampling time index, N, it will be appreciated that other embodiments of the invention can be embodied in the continuous time domain (i.e., analog and/or hybrid circuitry).

Figure 2:
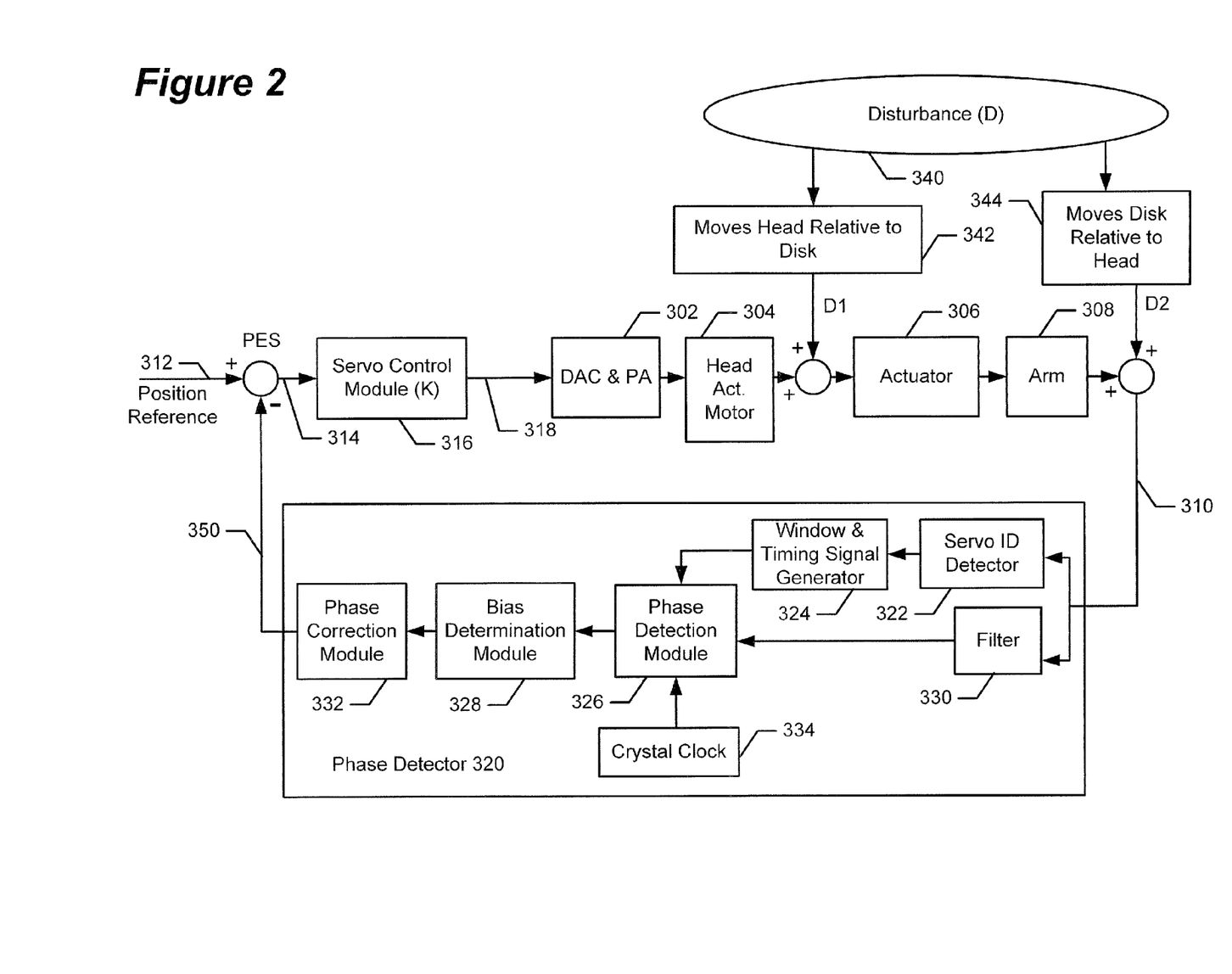
FIG. 2 is a block diagram of a servo control loop configured in a track-following mode and which can be partially embodied within the servo controller of FIG. 1 in accordance with some embodiments.

FIG. 2 is a block diagram of a servo control loop configured in a track settling and track-following mode and which can be partially embodied within the servo controller 104 of FIG. 1 in accordance with some embodiments. Referring to FIG. 2, the HDA 108 can be modeled in the servo control loop as including a digital-to-analog converter (DAC) and power amplifier 302, a head actuator motor (e.g., voice coil motor) 304, an actuator 306, and an actuator arm 308.

An illustrated disturbance 340(D) imparts a first disturbance component 342 (e.g., vibration) that moves the head relative to a disk track, and imparts a second disturbance component 344 that moves the disk relative to the head. The second disturbance component 344 may result in, for example, disk speed variations that occur relative to the head due to disk runout (repeatable/non-repeatable runout) from eccentric disk track rotation and/or spindle motor speed variations.

The servo burst fields sensed by the head relative to a given track form components of a read signal 310 that is input to a phase detector 320. The phase detector 320 can include a servo ID detector 322, a window and timing signal generator 324, a phase detection module 326, a bias determination module 328, a phase correction module 332, and a crystal clock 334. The servo ID detector 322 and the window and timing signal generator 324 trigger operation of the phase detection module 326 and the phase change determination module 328 in response to detecting presence of the preamble and subsequent servo burst field components in the read signal 310. The read signal 310 is filtered by a filter 330 and input to the phase detection module 326 and the phase change determination module 328. Although various separate elements have been illustrated for the phase detector 320 for ease of explanation, it is to be understood that their functionality described herein may be combined into more or less elements.

The phase detection module 326 detects phases between a clock signal from the clock 334 and the servo burst fields in the read signal 310, and determines relative phase differences between the detected phases. The bias determination module 328 determines frequency variation induced biases in the detected phases in response to timing of the servo burst fields. The phase correction module 332 generates corrected relative phase differences 350 by combining the relative phase differences with the determined frequency variation induced biases to compensate for effects of the frequency variation on the detected phases.

The corrected phase differences 350 are combined with a reference position 312 (desired position) for the head to generate a position error signal (PES) 314. The PES 314 is therefore indicative of the difference between the actual and desired positions of the head (i.e., head position error), and is provided to a servo control module 316. The servo control module 316 responds to the value of PES 314 to generate a servo control signal 318.

The servo control signal 318 can be converted by a DAC/power amplifier 302 into an analog signal, assuming it was a digital signal, and then amplified and provided to a head actuator motor 304. The head actuator motor 304 is connected to an actuator 306 which moves an actuator arm 308 in response to the amplified control signal supplied to the head actuator motor 304. The head is connected to the actuator arm 308 (e.g., to an end of the actuator arm 308).

In this way, the servo control loop controls the positioning of the head relative to a selected track on the disk surface during reading/writing of data along the selected track. Moreover, because the phase detector 320 generates corrected relative phase differences 350 that have been compensated for bias that was introduced into detected phases by frequency variation in occurrence of the servo burst patterns, the servo control loop may be able to more accurately control positioning of the head relative to a track in presence of increased data storage densities and/or disturbances.

The various effects caused by frequency variation on the detected phases and various operations that can be carried out by the phase detector 320 to reduce these effects will now be described below.

For purposes of explanation only, a servo sector is assumed to have a header field and two servo burst fields PS1 and PS2, although any number of servo burst fields may be used. The phase detection module 326 can detect phases $PS_1$ ($\theta_1$) and $PS_2$ ($\theta_2$) of the two respective fields as:

$$\theta_1 = \theta$$
$$\theta_2 = -\theta,$$

-continued
$$\theta = \frac{\pi}{2}\xi,$$
$$-2 \leq \xi < 2$$
$$-\pi \leq \theta < \pi,$$

where $\theta$ represents the phase when the head is at an off-track position $\xi$, which is normalized with respect to track width. Although the above assumed servo burst fields (e.g., +1 and −1 slopes and pi/2 per track) have been defined to facilitate the explanation of an exemplary embodiment, the invention is not limited thereto. Instead, the servo burst fields may be configured to have any known relationship.

Ideally, the half-rate read signal 310 components, $y_1$ and $y_2$ for the respective PS1 and PS2 fields, can be defined by the following equations:

$$y_1(t) = \sin\left(2\pi\frac{F_s}{2}t + \theta\right)$$
$$y_2(t) = \sin\left(2\pi\frac{F_s}{2}t - \theta\right),$$

respectively. Again, the invention is not limited to use of half-rate read signal because a full rate, quarter-rate, or any integer or non-integer multiple of Fs signal may be used instead. The term $F_s$ represents the servo preamble frequency. Assuming perfect phase and frequency acquisition (i.e., no phase error or frequency error), the sampled read signal components (with a sampling frequency of $4F_s$) can be defined by the following equation:

$$y_1[n] = \sin\left(\frac{2\pi}{8}n + \theta\right)$$
$$y_2[n] = \sin\left(\frac{2\pi}{8}n - \theta\right).$$

It is to be understood that the sinusoidal functions are used for simplicity of explanation without limitation to the invention. The invention may be applied to any servo read signal which has a periodic component.

The phases can be estimated using a four quadrant a tan( ) function with the following equations:

$$\hat{\theta}_1 = a\tan\left(\frac{PS_1 \text{Cos}}{PS_1 \text{Sin}}\right) = \theta$$
$$\hat{\theta}_2 = a\tan\left(\frac{PS_2 \text{Cos}}{PS_2 \text{Sin}}\right) = -\theta.$$

Alternatively, any estimator of signal phase can be used to obtain $\hat{\theta}_i$ in not only the above-equations, but further throughout this explanation where ever phase of a signal is used.

Final phase and position error signal estimation can be determined from the following equations:

$$\hat{\theta} = \hat{\theta}_1 - \hat{\theta}_2 = 2\theta \text{ and } \hat{\xi} = \frac{\hat{\theta}}{\pi}.$$

However, during actual operation of the disk drive, timing acquisition errors exist due to, for example, disk runout and spindle motor speed variation that cause variation in the associated timing of the servo burst field components in the read signal 310 and cause related error in the phases detected by the phase detection module 326. For purposes of explanation only, the read signal components, $y_1$ and $y_2$ for the PS1 and PS2 fields, respectively, are defined to be represented by the following equations:

$$y_1(t) = \sin\left(2\pi \frac{F_s}{2}(1+\Delta f)t + \theta\right)$$

$$y_2(t) = \sin\left(2\pi \frac{F_s}{2}(1+\Delta f) - \theta\right)$$

Again, it is to be understood that the sinusoidal functions are used for simplicity of explanation without limitation to the invention. The invention may be applied to any servo read signal which has a periodic component. An assumption has been made herein for simplicity of explanation, that the timing loop has perfect phase acquisition. When, there is phase acquisition error, this can easily be incorporated into the derivation. In practice, the equation coefficients can be determined experimentally.

The servo frequency is $F_s(1+\Delta f)$ and the acquired sampling frequency by the timing loop is $4F_s$. The sampled readback signals can be represented by the following equations:

$$y_1[n] = \sin\left(\frac{2\pi}{8}n + \frac{2\pi}{8}(\Delta f)n + \frac{2\pi}{8}(\Delta f)N_1 + \theta\right)$$

$$y_2[n] = \sin\left(\frac{2\pi}{8}n + \frac{2\pi}{8}(\Delta f)n + \frac{2\pi}{8}(\Delta f)N_2 - \theta\right)$$

where the terms $N_1$ and $N_2$ represent the number of samples of the read signal 310 from the end of a preamble to the beginning of the $PS_1$ and $PS_2$ servo burst fields, respectively, responsive to the clock signal from the clock 334. In practice, these values may change depending upon many factors, and may be determined experimentally. The terms $$\frac{2\pi}{8}(\Delta f)N_1 \text{ and } \frac{2\pi}{8}(\Delta f)N_2$$

represent the accumulated phase errors at the beginning of $PS_1$ and $PS_2$ due to a frequency acquisition error $\Delta f$.

The terms $PS_1\,\mathrm{Sin}$, $PS_1\,\mathrm{Cos}$, $PS_2\,\mathrm{Sin}$, and $PS_2\,\mathrm{Cos}$ can be represented by the following equations:

$$PS_1\mathrm{Sin} \approx \mathrm{Cos}\left(\theta + \frac{2\pi}{8}(\Delta f)\frac{N}{2} + \frac{2\pi}{8}(\Delta f)N_1\right),$$

$$PS_1\mathrm{Cos} \approx \mathrm{Sin}\left(\theta + \frac{2\pi}{8}(\Delta f)\frac{N}{2} + \frac{2\pi}{8}(\Delta f)N_1\right)$$

$$PS_2\mathrm{Sin} \approx \mathrm{Cos}\left(-\theta + \frac{2\pi}{8}(\Delta f)\frac{N}{2} + \frac{2\pi}{8}(\Delta f)N_2\right)$$

$$PS_2\mathrm{Cos} \approx \mathrm{Sin}\left(-\theta + \frac{2\pi}{8}(\Delta f)\frac{N}{2} + \frac{2\pi}{8}(\Delta f)N_2\right)$$

where the term N represents the number of PS1 samples (or PS2 samples) from the read signal 310.

First-order linear effects, ideal readback signals, and perfect phase error are assumed for simplicity of explanation only and without limitation, which provides that the phases $\hat{\theta}_1$ and $\hat{\theta}_2$ for the PS1 and PS2 servo burst fields, respectively, can be estimated using a four quadrant a tan ( ) function based on the following equations:

$$\hat{\theta}_1 = a\tan\left(\frac{PS_1\mathrm{Cos}}{PS_1\mathrm{Sin}}\right) = \theta + \frac{2\pi}{8}(\Delta f)\frac{N}{2} + \frac{2\pi}{8}(\Delta f)N_1$$

$$\hat{\theta}_2 = a\tan\left(\frac{PS_2\mathrm{Cos}}{PS_2\mathrm{Sin}}\right) = -\theta + \frac{2\pi}{8}(\Delta f)\frac{N}{2} + \frac{2\pi}{8}(\Delta f)N_2$$

The phase estimation error inside of the $PS_2$ field due to frequency acquisition error (variation in frequency of occurrence) is represented in the above-equation as $$\frac{2\pi}{8}(\Delta f)\frac{N}{2}.$$

The accumulated phase error at the beginning of the $PS_2$ field due to frequency acquisition error (variation in frequency of occurrence) is represented in the above-equation as $$\frac{2\pi}{8}(\Delta f)N_2.$$

The phase detection module 326 determines a relative phase difference $\hat{\theta}$ by subtracting the phases of the servo burst fields PS1 and PS2 as follows:

$$\hat{\theta} = \hat{\theta}_1 - \hat{\theta}_2 = 2\theta - \frac{2\pi}{8}(\Delta f)(N_2 - N_1) = 2\theta - \frac{2\pi}{8}(\Delta f)N$$

The phase shift from the beginning of PS1 to the beginning of PS2 due to frequency offset (variation in speed between the head and timing of PS1 and Ps2) is represented by the portion of the above-equation as $$\frac{2\pi}{8}(\Delta f)N.$$

Therefore, phase estimation and position error signal estimation will be biased due to frequency acquisition error in the phase locked loop (PLL), as shown by the following equations:

$$\mathrm{Bias}(\hat{\theta}) \approx -\frac{2\pi}{8}(\Delta f)N$$

$$\mathrm{Bias}(\hat{\xi}) \approx -\frac{(\Delta f)N}{4}$$

First Set of Exemplary Operations of the Phase Detector:

The bias determination module 328 is configured to determine a frequency offset, which is a value that is determined to compensate for effects of the frequency variation, by adding the phase of the servo burst fields (e.g., $\theta_1$ of PS1 and $\theta_2$ of PS2), for example as shown by the following equations:

$$\hat{\theta}_{plus} = \hat{\theta}_1 + \hat{\theta}_2 = \frac{2\pi}{8}(\Delta f)N + \frac{2\pi}{8}(\Delta f)(N_1 + N_2) = \frac{2\pi}{8}(\Delta f)2N_2$$

The Bias($\hat{\theta}$) bias due to frequency offset is represented by the following equation:

$$\text{Bias}(\hat{\theta}) = -\frac{2\pi}{8}(\Delta f)N = -\frac{\hat{\theta}_1 + \hat{\theta}_2}{2N_2}N.$$

Assuming for purposes of explanation only that the equation coefficients are obtained under ideal conditions (e.g., perfect phase acquisition by the timing loop, sinusoidal readback signals, etc.), the phase correction module 332 can correct the Bias($\hat{\theta}$) bias due to frequency offset using $\hat{\theta}_{plus}$ based to the following equations:

$$\hat{\theta}_{corrected} = \hat{\theta} + \frac{\hat{\theta}_{plus}}{2N_2}N = \hat{\theta} + \frac{\hat{\theta}_1 + \hat{\theta}_2}{2N_2}N.$$

In the preceding equation, it is noted that the phase correction module 332 scales the frequency offset by a constant, which can be a ratio of the number of samples of the read signal between the beginning and end of the servo burst fields and the number of samples of the read signal between an end of the preamble and a beginning of the servo burst field, to determine the frequency variation induced bias.

Therefore, in accordance with some embodiments, the phase detector 320 can compensate the detected phase of the servo burst fields to reduce/remove effects from frequency variation according to operations that include the phase detection module 326 detecting the phases between the clock signal from the clock 334 and the servo burst fields (e.g., $\hat{\theta}_1$ of PS1 and $\hat{\theta}_2$ of PS2), as represented by the following equations:

$$\hat{\theta}_1 = a\tan\left(\frac{PS_1\text{Cos}}{PS_1\text{Sin}}\right) = \theta + \frac{2\pi}{8}(\Delta f)\frac{N}{2} + \frac{2\pi}{8}(\Delta f)N_1$$

$$\hat{\theta}_2 = a\tan\left(\frac{PS_2\text{Cos}}{PS_2\text{Sin}}\right) = -\theta + \frac{2\pi}{8}(\Delta f)\frac{N}{2} + \frac{2\pi}{8}(\Delta f)N_2$$

The phase detection module 326 can then determine the relative phase difference (e.g., $\hat{\theta}_1 - \hat{\theta}_2$) between the detected phases for the servo burst fields, as represented by the following equations which provide an estimate of the phase $\hat{\theta}$:

$$\hat{\theta} = \hat{\theta}_1 - \hat{\theta}_2 = 2\theta - \frac{2\pi}{8}(\Delta f)(N_2 - N_1) = 2\theta - \frac{2\pi}{8}(\Delta f)N$$

The bias determination module 328 can then determine the bias effects due to frequency change in the timing of the detected phases for the servo burst fields by adding the detected phases for the servo burst fields (e.g., $\hat{\theta}_{plus} = \hat{\theta}_1 + \hat{\theta}_2$), and the phase correction module 332 can add the relative phase difference to the frequency bias, as represented by the following approximate equations, to generate a corrected relative phase difference $\hat{\theta}_{corrected}$ that is compensated for the determined frequency variation induced bias:

$$\hat{\theta}_{corrected} = \hat{\theta} + \frac{\hat{\theta}_{plus}}{2N_2}N = \hat{\theta} + \frac{\hat{\theta}_1 + \hat{\theta}_2}{2N_2}N,$$

In general, instead of fixed constants, we can generalize the bias correction in this form for linear correction terms. Coefficients $k_1$ and $k_2$ can be found experimentally and they can vary in response to head skew, nonideal signal shapes, additional phase errors due to analog or digital filters etc.

$$\hat{\theta}_{corrected} = \hat{\theta} + k_1\hat{\theta}_{plus} + k_2$$

As described above, the signal 350 can be generated in response to the corrected relative phase difference and combined with the position reference 312 to generate the PES 314 as an input to the servo control module 316.

Second Set of Exemplary Operations of the Phase Detector:

In accordance with some additional embodiments, the phase detector 320 may be able to improve its compensation for effects of frequency change when generating the corrected relative phase difference by generating a correction term that can be independent of phase estimation error. In particular, the phase detector 320 can divide each of the servo burst fields into at least two subfields, with each of the subfields including a plurality of transitions. The phase detector can then determine frequency change that occurs relative to timing of the transitions within the at least two subfields of each of the servo burst fields, and can generate the corrected relative phase difference in response to the determined frequency changes.

Thus, by way of further example, the phase detection module 326 can be triggered by the window and timing signal generator 324 to subdivide PS1 into two subfields $\theta_1^1$ and $\theta_1^2$ and may further subdivide PS2 into two subfields $\theta_2^1$ and $\theta_2^2$, and to detect phases for each half subfield, as represented by the following equations:

$$\theta_1^1 = \theta + \frac{2\pi}{8}(\Delta f)\frac{N}{4} + \frac{2\pi}{8}(\Delta f)N_1 + \theta_{error},$$

$$\theta_1^2 = \theta + \frac{2\pi}{8}(\Delta f)\frac{3N}{4} + \frac{2\pi}{8}(\Delta f)N_1 + \theta_{error},$$

$$\theta_1 = \theta + \frac{2\pi}{8}(\Delta f)\frac{N}{2} + \frac{2\pi}{8}(\Delta f)N_1 + \theta_{error},$$

$$\theta_2 = -\theta + \frac{2\pi}{8}(\Delta f)\frac{N}{2} + \frac{2\pi}{8}(\Delta f)N_2 + \theta_{error},$$

$$\hat{\theta}_1^2 - \hat{\theta}_1^1 = \frac{2\pi}{8}(\Delta f)\frac{N}{2}$$

which can be independent of phase acquisition error.

Therefore, in accordance with some embodiments, the phase detector 320 can compensate the detected phases of the servo burst fields so as to reduce/remove bias effects from frequency variation according to operations that include operating the phase detection module 326 to detect phases between the clock signal from the clock 3334 and the servo burst fields (e.g., $\hat{\theta}_1$ of PS1 and $\hat{\theta}_2$ of PS2), as represented by the following equations:

$$\hat{\theta}_1 = \theta + \frac{2\pi}{8}(\Delta f)\frac{N}{2} + \frac{2\pi}{8}(\Delta f)N_1$$

-continued $$\hat{\theta}_2 = -\theta + \frac{2\pi}{8}(\Delta f)\frac{N}{2} + \frac{2\pi}{8}(\Delta f)N_2$$

The phase detector 320 can then determine the relative phase difference (e.g., $\hat{\theta}_1 - \hat{\theta}_2$) between the detected phases for the servo burst fields, as represented by the following equations which provide an estimate of the phase $\hat{\theta}$:

$$\hat{\theta} = \hat{\theta}_1 - \hat{\theta}_2 = 2\theta - \frac{2\pi}{8}(\Delta f)(N_2 - N_1) = 2\theta - \frac{2\pi}{8}(\Delta f)N$$

The bias determination module 328 can then determine the bias effects due to frequency change in the timing of the detected phases for the subfields (e.g., $\theta_1^{\ 1}$ and $\theta_1^{\ 2}$) by subtracting the phase of the second subfield from the phase of the first subfield (e.g., $\hat{\theta}_1^{\ 2} - \hat{\theta}_1^{\ 1}$), with the result corresponding to a frequency change induced bias in the detected phases. A corrected relative phase difference $\hat{\theta}_{corrected}$ is then determined by adding the frequency variation induced bias to the determined relative phase difference $\hat{\theta}$, as represented by the following approximate equation, to generate a corrected relative phase difference that is compensated for the determined frequency change:

$$\hat{\theta}_{corrected} = \hat{\theta} + 2(\hat{\theta}_1^{\ 2} - \hat{\theta}_1^{\ 1}).$$

As described above, the signal 350 can be generated in response to the corrected relative phase difference and combined with the position reference 312 to generate the PES 314 as an input to the servo control module 316.

This equation is obtained for purposes of explanation only under ideal conditions (e.g., ideal sinusoidal readback signals, zero skew etc.), Again, instead of fixed constants, we can generalize the bias correction in this form for linear correction terms. Coefficients $k_1$, $k_2$ and $k_3$ in the following equation can be found experimentally and they can vary in response to head skew, nonideal signal shapes etc.

$$\hat{\theta}_{corrected} = \hat{\theta} + k_1\hat{\theta}_1^{\ 2} + k_2\hat{\theta}_2^{\ 1} + k_3$$

Similarly, subfields of PS2 alone or with the subfields of PS1 can be used to determine bias due to frequency offset.

Although an exemplary embodiment has been provided in which the servo burst fields are subdivided into two parts, the invention is not limited thereto. Instead, the servo burst fields PS1 and PS2 may be subdivided into n subsets, and the phase detector 320 can find the slope (e.g., $2\pi/8(\Delta f)$) of the detected phases using a regression/interpolation algorithm. The frequency offset term is determined therefrom and used to generate a corrected phase. For example, when the servo burst fields are subdivided into three parts (i.e., n=3), the phase values can be defined by the following equations:

$$\theta_1^1 = \theta + \frac{2\pi}{8}(\Delta f)\frac{N}{6} + \frac{2\pi}{8}(\Delta f)N_1 + \theta_{error},$$

$$\theta_1^2 = \theta + \frac{2\pi}{8}(\Delta f)\frac{N}{2} + \frac{2\pi}{8}(\Delta f)N_1 + \theta_{error},$$

$$\theta_1^3 = \theta + \frac{2\pi}{8}(\Delta f)\frac{5N}{6} + \frac{2\pi}{8}(\Delta f)N_1 + \theta_{error},$$

$$\theta_2^1 = -\theta + \frac{2\pi}{8}(\Delta f)\frac{N}{6} + \frac{2\pi}{8}(\Delta f)N_2 + \theta_{error},$$

-continued $$\theta_2^2 = -\theta + \frac{2\pi}{8}(\Delta f)\frac{N}{2} + \frac{2\pi}{8}(\Delta f)N_2 + \theta_{error},$$

$$\theta_2^3 = -\theta + \frac{2\pi}{8}(\Delta f)\frac{5N}{6} + \frac{2\pi}{8}(\Delta f)N_2 + \theta_{error},$$

In general, the phase estimates $\theta_1^{\ 1}, \theta_1^{\ 2} \ldots \theta_1^{\ K}$ can be used to estimate the bias corresponding to the frequency offset. When there is no frequency offset, estimates $\theta_1^{\ 1}, \theta_1^{\ 2} \ldots \theta_1^{\ K}$ are expected to be the same values. When there is frequency offset, the phase values increase or decrease from $\theta_1^{\ 1}$ to $\theta_1^{\ K}$ with a rate proportional to the frequency offset. This rate can easily be found by linear regression or a suitable method and the bias from frequency offset can be compensated.

Similarly, subfields of PS2 alone or with the subfields of PS1 can be used to determine bias due to frequency offset.

Third Set of Exemplary Operations of the Phase Detector:

In accordance with some additional embodiments, the phase detector 320 may be configured to detect three phases between the clock signal and three servo burst fields (e.g., PS1, PS2, PS3), where each of the three servo burst fields are circumferentially spaced apart and have a radially varying phase across the disk. The radially varying phase of the servo burst fields (PS1) and (PS3) may be the same as each other and may be different from the radially varying phase of the in-between servo burst field (PS2).

The phase detection module 326 can detect the phases $\theta_1$, $\theta_2$, $\theta_3$ between the clock signal from clock 334 and the three servo burst fields PS1, PS2, PS3, as represented by the following equations:

$$\theta_1 = \theta + \frac{2\pi}{8}(\Delta f)\frac{N}{2} + \frac{2\pi}{8}(\Delta f)N_1 + \theta_{error},$$

$$\theta_2 = -\theta + \frac{2\pi}{8}(\Delta f)\frac{N}{2} + \frac{2\pi}{8}(\Delta f)N_2 + \theta_{error},$$

$$\theta_3 = \theta + \frac{2\pi}{8}(\Delta f)\frac{N}{2} + \frac{2\pi}{8}(\Delta f)N_3 + \theta_{error}.$$

The relative phase difference between the third and first phases, which are represented by the following approximate equation, can be independent of phase estimation errors and, therefore, can be used to determine the frequency offset which that indicates the change if frequency over the servo burst fields:

$$\hat{\theta}_3 - \hat{\theta}_1 = \frac{2\pi}{8}(\Delta f)(N_3 - N_1) = \frac{2\pi}{8}(\Delta f)N.$$

Therefore, in accordance with some embodiments, the phase correction module 332 can compensate the relative phase difference between the servo burst fields to reduce/remove effects from frequency variation without influence of phase errors between the third and first phases.

More particularly, the phase detection module 326 can detecting the phase between the clock signal from clock 334 and the three servo burst fields (e.g., $\hat{\theta}_1$ of PS1, $\hat{\theta}_2$ of PS2, and $\hat{\theta}_3$ of PS3), as represented by the following equations:

$$\hat{\theta}_1 = a\tan\left(\frac{PS_1 \text{Cos}}{PS_1 \text{Sin}}\right) = \theta + \frac{2\pi}{8}(\Delta f)\frac{N}{2} + \frac{2\pi}{8}(\Delta f)N_1$$

-continued $$\hat{\theta}_2 = a\tan\left(\frac{PS_2\text{Cos}}{PS_2\text{Sin}}\right) = -\theta + \frac{2\pi}{8}(\Delta f)\frac{N}{2} + \frac{2\pi}{8}(\Delta f)N_2$$

$$\hat{\theta}_3 = a\tan\left(\frac{PS_3\text{Cos}}{PS_3\text{Sin}}\right) = \theta + \frac{2\pi}{8}(\Delta f)\frac{N}{2} + \frac{2\pi}{8}(\Delta f)N_3$$

The phase detection module 326 can then determine the relative phase difference (e.g., $\hat{\theta}_1 - \hat{\theta}_2$) between the detected phases for the first and second servo burst fields, as represented by the following equations which provide an estimate of the phase $\hat{\theta}$:

$$\hat{\theta} = \hat{\theta}_1 - \hat{\theta}_2 = 2\theta - \frac{2\pi}{8}(\Delta f)(N_2 - N_1) = 2\theta - \frac{2\pi}{8}(\Delta f)N$$

The bias determination module 328 can then determine the frequency variation induced bias that occurs between timing of the detected phases for the third and first servo burst fields (e.g., $\hat{\theta}_3$ and $\hat{\theta}1$) by subtracting the detected third phase from the first phase (e.g., $\hat{\theta}_3 - \hat{\theta}_1$).

The phase correction module 332 can determine a corrected relative phase difference by adding the frequency variation induced bias to the determined relative phase difference, as represented by the following approximate equation, to generate a corrected relative phase difference that is compensated for the determined frequency change:

$$\hat{\theta}_{corrected} = \hat{\theta} + (\hat{\theta}_3 - \hat{\theta}_1).$$

As described above, the signal 350 can be generated in response to the corrected relative phase difference and combined with the position reference 312 to generate the PES 314 as an input to the servo control module 316.

The above equation is obtained for purposes of explanation only under ideal conditions (e.g. ideal sinusoidal readback signals, zero skew, no additional phase delays etc.), Again, instead of fixed constants, we can generalize the bias correction in this form for linear correction terms. Coefficients $k_1$, $k_2$, and $k_3$ in the following equation can be found experimentally and they can vary in response to head skew, nonideal signal shapes etc.

$$\hat{\theta}_{corrected} = \hat{\theta} + k_1\hat{\theta}_1 + k_2\hat{\theta}_3 + k_3$$

Although an exemplary embodiment has been provided in which three servo burst fields are used, the invention is not limited thereto. Instead, any number of servo burst fields can be used, and the phase detector 320 can use the individual phase values to find the slope of the detected phases using a regression/interpolation algorithm.

In general, the phase estimates $\hat{\theta}_1, \hat{\theta}_2, \ldots \hat{\theta}_l$ can be used to estimate the bias corresponding to the frequency offset. When there is frequency offset, the phase values increase or decrease with a rate proportional to the frequency offset. This rate can easily be found by linear regression or a suitable method and the bias from frequency offset can be compensated. The frequency offset term is determined therefrom and used to generate a corrected phase.

$$\hat{\theta}_{corrected} = \hat{\theta} + k_1\hat{\theta}_1 + k_2\hat{\theta}_2 + \ldots + k_l\hat{\theta}_l + k_{l+1}$$

The coefficients $k_1, \ldots, k_l$ can be found theoretically or experimentally.

Forth Set of Exemplary Operations of the Phase Detector:

In accordance with some additional embodiments, the phase detector 320 may be able to improve the compensation for frequency change when generating the corrected relative phase difference by combining and extending the above-described first, second, and third sets of operations to a defined number of servo burst fields with a defined number numbers of subfields where the autocorrelation matrix of the vector of phase measurement errors from each subfield may be arbitrary.

In the following discussion of a fourth set of operations of the phase detector 320, the term m represents the index of the burst field, $m=1, \ldots, M$, and denotes quantities pertaining to the burst field m with the subscript m.

The pattern phase $\theta_m$ of the $m^{th}$ burst field $PS_m$ may be expressed as $$\theta_m^\xi = \theta_m(\xi) = k_m\xi + \frac{2\pi}{L_m}n + \theta_{0,m},$$

where the term $\xi$ represents the normalized off-track position, the term $\theta_{0,m}$ represents the pattern phase at the beginning of field m at off-track position $\xi=0$, the term $L_m$ represents the pattern period in the down-track direction measured in numbers of channel bits, the term $k_m$ represents the pattern radial positional frequency in the off-track direction, and the term n represents the number of channel bits from the beginning of $PS_m$.

The phase detection module 326 samples the read signal 310 responsive to the clock cycles from clock 334 from burst m in the presence of frequency acquisition error $\Delta f$ and phase acquisition error $\theta_{error}$ as defined by the following approximate equation:

$$y_m[n] = \sin\left(\begin{array}{c}\frac{2\pi}{L_m}n + \frac{2\pi}{L_m}(\Delta f)(N_m + n) + \\ k_m\xi + \theta_{0,m} + \theta_{error,m}\end{array}\right) + \varepsilon_m[n],$$

where the term $\varepsilon_m[n]$ represents the noise in the sampled burst readback signal.

In a similar manner as describe above, the phase detection module 326 can determine $PS_m$ Sin and $PS_m$ Cos based on the following approximate equations:

$$PS_m\text{Sin} \approx \cos\left(\begin{array}{c}\frac{2\pi}{L_m}(\Delta f)\left(N_m + \frac{1}{2}N_{burst,m}\right) + \\ k_m\xi + \theta_{0,m} + \theta_{error,m}\end{array}\right) + w_{\sin,m}$$

$$PS_m\text{Cos} \approx \sin\left(\begin{array}{c}\frac{2\pi}{L_m}(\Delta f)\left(N_m + \frac{1}{2}N_{burst,m}\right) + \\ k_m\xi + \theta_{0,m} + \theta_{error,m}\end{array}\right) + w_{\cos,m},$$

where the terms $w_{cos,m}$ and $w_{cos,m}$ represent the noise components in $PS_m$ Sin and $PS_m$ Cos, respectively.

Calculation of the phase estimate yield $\hat{\theta}_m$a tan ($PS_m$ Cos, $PS_m$ Sin) yields:

$$\hat{\theta}_m = k_m\xi + \theta_{0,m} + \frac{2\pi}{L_m}(\Delta f)\left(N_m + \frac{1}{2}(N_{burst,m})\right) + \theta_{error,m} + w_m,$$

where the term $w_m$ represents the phase estimation noise.

Defining $$\tilde{\theta}_m = \hat{\theta}_m - \theta_{0,m}, \omega_{0,m} = \frac{2\pi}{L_m} \text{ and } \tilde{N}_m = N_m + \frac{1}{2}(N_{burst,m}),$$

$k=(k_1, k_2, \ldots, k_M)^T$ the set of M equations (4) for m=1, ..., M may be expressed in vector form by the following equation:

$$\tilde{\theta}=\xi \cdot k+(\Delta f)\cdot(\omega_0 \bullet \tilde{N})+\theta_{error}\cdot 1+w,$$

where $\tilde{\theta}=(\tilde{\theta}_1, \tilde{\theta}_2, \ldots \tilde{\theta}_M)^T$, $k=(\tilde{k}_1, \tilde{k}_2, \ldots, \tilde{k}_M)^T$, $(\omega_0 \bullet \tilde{N})=(\omega_{0,1}\tilde{N}_1, \omega_{0,2}\tilde{N}_2, \ldots, \omega_{0,M}\tilde{N}_M)^T$, $1=(1, 1, \ldots, 1)^T$ and $w=(w_1, w_2, \ldots, w_M)^T$.

Defining $$A = [k \quad \omega_0 \cdot \tilde{N} \quad 1]; \gamma = \begin{bmatrix} \xi \\ \Delta f \\ \theta_{error} \end{bmatrix}, \text{ then, } \tilde{\theta} = A\gamma + w.$$

Assuming that w is a Gaussian random vector with zero mean and covariance matrix $\Sigma_w$, and letting $l(\gamma; \tilde{\theta})$ be the log-likelihood function for $\gamma$, given $\tilde{\theta}$. Then, $l(\gamma; \tilde{\theta})=\text{const}-\frac{1}{2}[A\gamma-\tilde{\theta}]^T\Sigma_w^{-1}[A\gamma-\tilde{\theta}]$.

The maximum likelihood solution for $\gamma$ can be represented by the following equation:

$$\hat{\gamma}_{ML} = \underset{\gamma}{\operatorname{argmax}} l(\gamma; \tilde{\theta}) = [A^T \Sigma_W^{-1} A]^{-1} A^T \tilde{\theta}.$$

Accordingly, the bias determination module 328 can operate to generate a maximum likelihood estimate of the off-track position, which can be represented as $\hat{\xi}_{ML}=c_1^T\tilde{\theta}$, and can operate to generate a maximum likelihood estimate of the frequency acquisition error, which can be represented as $\Delta\hat{f}_{ML}=c_2^T\tilde{\theta}$, and can operate to generate a maximum likelihood estimate of the phase acquisition error, which can be represented as $(\theta_{error})_{ML}=c_2^T\tilde{\theta}$, where $$c_1^T=[1\ 0\ 0](A^T\Sigma_w^{-1}A)^{-1}A^T, c_2^T=[0\ 1\ 0](A^T\Sigma_w^{-1}A)^{-1}A^T, c_3^T=[0\ 0\ 1](A^T\Sigma_w^{-1}A)^{-1}A^T$$

The fourth set of operations is therefore based on developing a Maximum Likelihood Estimate of $\xi$ under an assumed statistical model for the phase estimation noise, where $\xi$, $\Delta f$ and $\theta_{error}$ are all deterministic but unknown parameters. This approach may also provide flexibility on the associated slopes and number of operational chevrons.

Therefore, in accordance with some embodiments, the phase detector 320 can determine phase (determined as a phase difference with respect to the track center) and which at an off-track location ($\xi$) will be effected by phase acquisition error in the $m^{th}$ burst field ($\theta_{error,m}$) and frequency acquisition error ($\Delta f$) as represented by the following equation:

$$\tilde{\theta}_m = k_m \xi + \frac{2\pi}{L_m}(\Delta f)\left(N_m + \frac{1}{2}(N_{burst,m})\right) + \theta_{error,m} + w_m,$$

where the term $w_m$ represents random phase estimation noise. The other parameters are known a priori (from pattern design) and in which: the term $L_m$ represents the pattern period in the down-track direction measured in numbers of channel bits; the term $k_m$ represents the pattern radial positional frequency in the off-track direction; the term $N_m$ represents the number of samples since the end of the phase/frequency acquisition till the beginning of the $m^{th}$ burst; and the term $N_{burst,m}$ represents the number of samples for the $m^{th}$ burst field.

If these phase and frequency acquisition errors are not corrected, this would result in incorrect estimation of off-track location (the estimate ($\hat{\xi}$) should be as close to the actual ($\xi$) as possible). In accordance with the four sets of operations, the servo detector 320 determines the best (in the maximum likelihood sense) estimate of the phase acquisition error, the frequency acquisition error (frequency variation induced bias), and the off-track location from the phase calculated at each of the servo burst fields in the presence of these errors, and compensates the relative phase differences to generate a corrected phase difference that can be output as signal 350 for use in generating the PES 314.

The equations in the above exemplary operations may change as a function of the radial location of the head, skew angle of the head, and/or other head to disk interface characteristics. Therefore, in some embodiment, a regression technique may be used to compute the equation coefficients at different radial locations across the disk and/or at different skew angles. The equation coefficients may be stored in a lookup table and/or a parametric equation for reference during operation of the disk drive.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A phase detector that detects phases between a clock signal and a plurality of servo burst fields on a moving storage media, that determines a relative phase difference between the detected phases for at least two of the servo burst fields, that determines a frequency variation induced bias in the detected phases in response to timing of the at least two servo burst fields, and that combines the relative phase difference with the determined frequency variation induced bias to generate a corrected relative phase difference.

2. The phase detector of claim 1, wherein the phase detector determines the frequency variation induced bias based on summation of the detected phases of the at least two servo burst fields.

3. The phase detector of claim 2, wherein the phase detector sums the phases of two adjacent servo burst fields to generate a frequency offset, scales the frequency offset by a constant to generate the frequency variation induced bias, and adds the frequency variation induced bias to the relative phase difference between the detected phases for the two servo burst fields to generate a corrected relative phase difference.

4. The phase detector of claim 3, wherein the phase detector samples a read signal, received from a sensor reading the media, $N_1$ times between an end of a preamble and a beginning of one of the servo burst fields indicated by the read signal, samples the read signal N times between the beginning and an end of the servo burst field, and scales the frequency offset based on a ratio of N to $N_1$ to generate the frequency variation induced bias.

5. The phase detector of claim 1, wherein:
the phase detector responds to a read signal including components of the servo burst fields read from the media by a sensor;

the relative phase difference determined by the phase detector is indicative of radial positions of the sensor relative to the servo burst fields; and the phase detector determines the frequency variation induced bias in response to timing variations occurring between the servo burst field components in the read signal.

6. The phase detector of claim 1, wherein:

the phase detector determines the frequency variation induced bias in response to timing variation between a plurality of transitions within each of the servo burst fields, and generates the corrected relative phase difference with compensation for the timing variation.

7. The phase detector of claim 6, wherein:

the phase detector divides each of the servo burst fields into at least two subfields with each of the subfields including a plurality of transitions;

the phase detector determines frequency changes that occur relative to timing of the transitions within the at least two subfields of each of the servo burst fields; and the phase detector generates the corrected relative phase difference in response to the frequency changes.

8. The phase detector of claim 7, wherein:

the phase detector detects phases between the clock signal and the transitions within at least two subfields of the servo burst field, and determines the frequency change occurring during one of the servo burst fields in response to timing differences between the detected phases for the at least two subfields of the servo burst field.

9. The phase detector of claim 8, wherein:

the phase detector samples a read signal, received from a sensor reading the media, N times between a beginning and an end of the servo burst field, and scales the determined frequency change based on N.

10. The phase detector of claim 7, wherein:

the phase detector generates a frequency offset value based on regression/interpolation among the determined frequency changes of a sequence of the servo burst fields, scales the frequency offset by a constant to generate the frequency variation induced bias, and adds the frequency variation induced bias to the relative phase difference for at least two of the sequence of the servo burst fields to generate the corrected relative phase difference.

11. The phase detector of claim 1, wherein:

the phase detector detects three phases between the clock signal and three of the servo burst fields on a rotating disk media, each of the three servo burst fields being circumferentially spaced apart and having a radially varying phase, and at least two of the three servo burst fields have different radially varying phases;

the phase detector determines a relative phase difference between the detected phases for the three servo burst fields; and the phase detector determines the frequency variation induced bias in response to timing of the detected phases for at least a first and last occurring ones of the three servo burst fields, and combines the relative phase difference with the determined frequency variation induced bias to generate the corrected relative phase difference.

12. The phase detector of claim 11, wherein the phase detector generates the corrected relative phase difference by scaling and adding the frequency variation induced bias to the relative phase difference for the three servo burst fields.

13. A method comprising:

detecting phases between a clock signal and a plurality of servo burst fields;

determining a relative phase difference between the detected phases;

determining a frequency variation induced bias in the detected phases in response to timing of the servo burst fields; and combining the relative phase difference with the determined frequency variation induced bias to generate a corrected relative phase difference.

14. The method of claim 13, further comprising:

summing the phases of two adjacent servo burst fields to generate a frequency offset;

scaling the frequency offset by a constant to generate the frequency variation induced bias; and adding the frequency variation induced bias to the relative phase difference between the detected phases for the two servo burst fields to generate a corrected relative phase difference.

15. The method of claim 14, further comprising:

sampling a read signal $N_1$ times between an end of a preamble and a beginning of one of the servo burst fields indicated by the read signal;

sampling the read signal N times between the beginning and an end of the servo burst field; and scaling the frequency offset by a ratio of N to $N_1$ to generate the frequency variation induced bias.

16. The method of claim 13, further comprising:

dividing each of the servo burst fields into at least two subfields with each of the subfields including a plurality of transitions;

determining frequency changes that occur relative to timing of the transitions within the at least two subfields of each of the servo burst fields; and generating the corrected relative phase difference in response to the frequency changes.

17. The method of claim 13, further comprising:

detecting three phases between the clock signal and three of the servo burst fields on a rotating disk media, each of the three servo burst fields being circumferentially spaced apart and having a radially varying phase, and at least two of the three servo burst fields have different radially varying phases;

determining a relative phase difference between the detected phases for the three servo burst fields;

determining the frequency variation induced bias in response to timing of the detected phases for at least a first and last occurring ones of the three servo burst fields; and combining the relative phase difference with the determined frequency variation induced bias to generate the corrected relative phase difference.

18. A servo controller comprising:

a phase detector that samples a read signal, which contains servo burst field components, $N_1$ times between an end of a preamble and a beginning of a first servo burst field, samples the read signal N times between the beginning and an end of the first servo burst field, detects phases between a clock signal and the first servo burst field and a second servo burst field, and determines a relative phase difference between the detected phases for the first and second servo burst fields;

the phase detector sums the phases of the first and second servo burst fields to generate a frequency variation induced bias that indicates effect of frequency variation on the detected phases; and the phase detector scales the frequency variation induced bias by a ratio of N to $N_1$, and adds the scaled frequency variation induced bias to the relative phase difference between the phases for the first and second servo burst fields to generate a corrected relative phase difference.

19. The servo controller of claim 18, wherein:

the phase detector detects phases for at least two subfields of each of the servo burst fields, with each of the subfields including a plurality of transitions;

the phase detector determines the frequency variation induced bias in response to detected frequency changes that occur relative to timing of the transitions within the at least two subfields of each of the servo burst fields; and the phase detector generates the corrected relative phase difference in response to the frequency changes.

20. The servo controller of claim 18, wherein:

the phase detector detects three phases between the clock signal and three of the servo burst fields on a rotating disk media, each of the three servo burst fields being circumferentially spaced apart and having a radially varying phase, and at least two of the three servo burst fields have different radially varying phases, and determines a relative phase difference between the detected phases for the three servo burst fields;

the phase detector determines the frequency variation induced bias in response to timing of the detected phases for at least a first and last occurring ones of the three servo burst fields; and the phase detector combines the relative phase difference with the determined frequency variation induced bias to generate the corrected relative phase difference.

* * * * *